United States Patent [19]

Tarasenko et al.

[11] Patent Number: 5,735,740
[45] Date of Patent: Apr. 7, 1998

[54] DEVICE FOR SEPARATING FRUIT AND ROOT-CROPS FROM EXTRANEOUS MATERIAL

[76] Inventors: Vladimir Vitalievich Tarasenko, Apt. 74 22b Prodoinaya str., 332313 Melitopol Zaporozhskaya obl., Ukraine; Vasily Vasilievich Kindzersky, ul. Lesichko 20-12, 279200 Beltsy, Rep. of Moldova

[21] Appl. No.: 564,291

[22] PCT Filed: Dec. 2, 1993

[86] PCT No.: PCT/UA93/00006

§ 371 Date: Aug. 9, 1996

§ 102(e) Date: Aug. 9, 1996

[87] PCT Pub. No.: WO95/15075

PCT Pub. Date: Jun. 8, 1995

[51] Int. Cl.$^6$ ............................................. A01D 46/00
[52] U.S. Cl. ........................... 460/97; 460/144; 460/145; 171/124
[58] Field of Search ..................... 56/14.6; 460/133, 460/97, 98, 144, 145, 146, 147, 148; 171/127, 132, 124, 111, DIG. 1, 27

[56] References Cited

U.S. PATENT DOCUMENTS

| 3,810,512 | 5/1974 | Porter | 171/27 X |
| 4,407,370 | 10/1983 | Small et al. | 171/124 |

*Primary Examiner*—Terry Lee Melius
*Attorney, Agent, or Firm*—Collard & Roe, P.C.

[57] ABSTRACT

A device for separating vegetables and root-crops from admixtures, comprising a transporter mounted on a frame and a device mounted on the exit end of the transporter for removing the vegetables from the transporter. The transporter has a plurality of protruding fingers for receiving separation products comprised of vegetables and admixtures and an upper bed with at least one bent part so as to create upwardly and downwardly inclined parts. The bent part causes the protruding fingers to move apart and allow the separation products to drop therebetween, wherein after the fingers pass through the bent part, the fingers clamp together and destroy at least a portion of the admixtures.

32 Claims, 9 Drawing Sheets

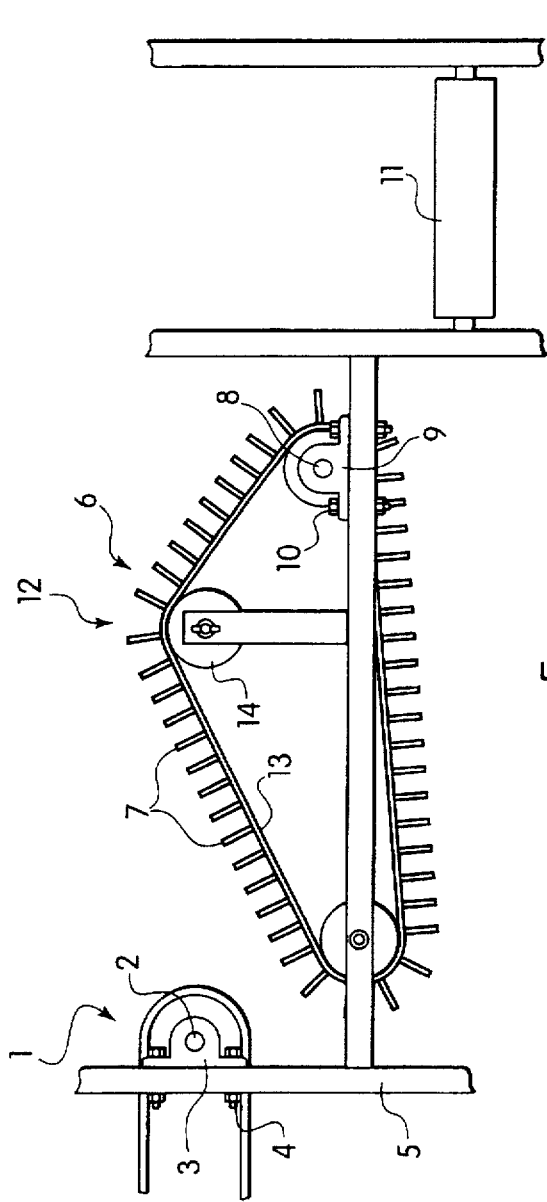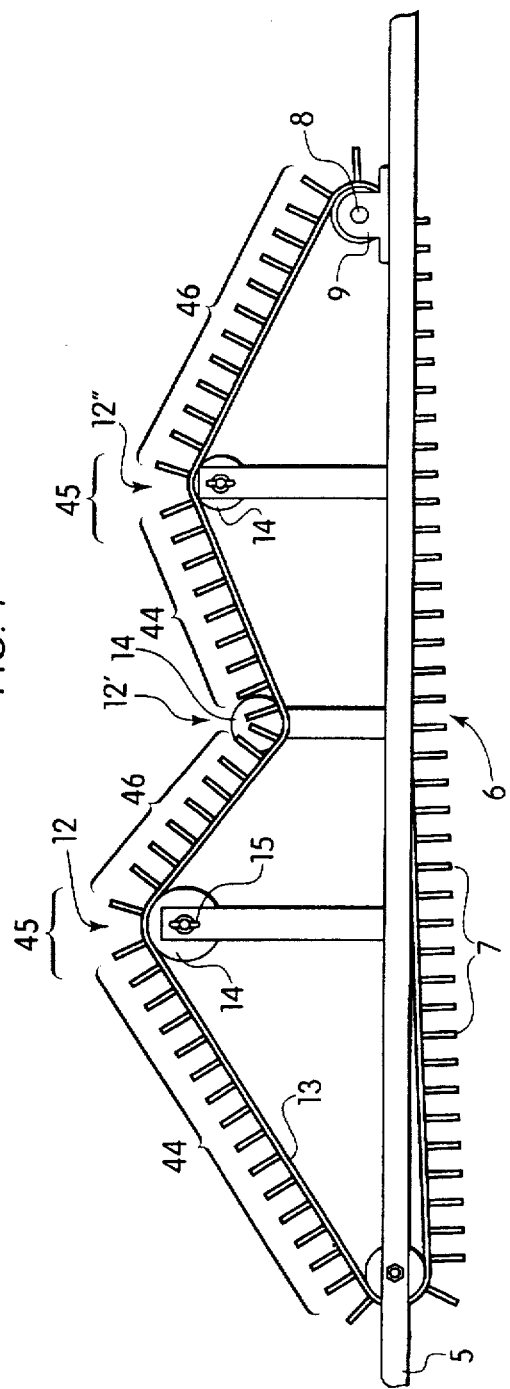

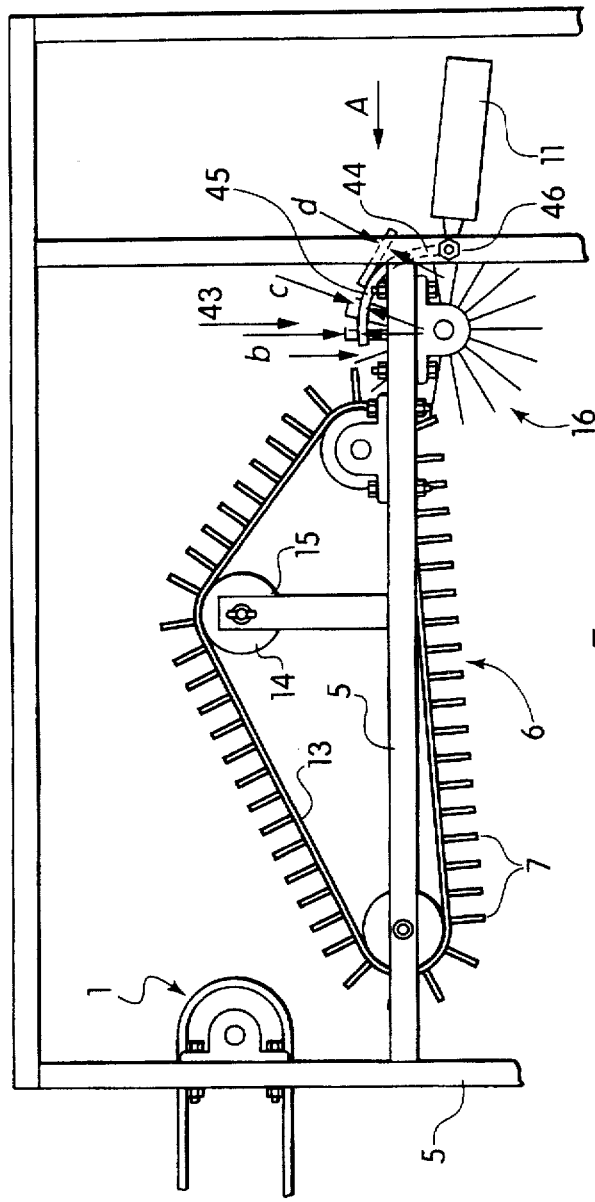
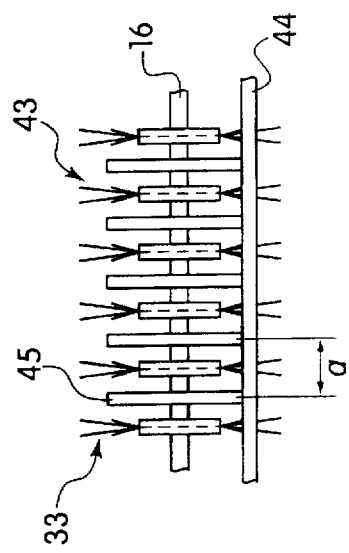
FIG. 14
FIG. 15

DEVICE FOR SEPARATING FRUIT AND ROOT-CROPS FROM EXTRANEOUS MATERIAL

BACKGROUND OF THE INVENTION

1. The Technical Field

This invention concerns agricultural machines or, more exactly, equipment for separating vegetables and root-crops from admixtures.

2. The Prior Art

A common device for separating potatoes from admixtures such as soil, rocks and weeds, contains a cylindrical drum with an elastic surface and a transporter with elastic fingers for picking vegetables or root-crops. The transporter is made as a horizontal endless band which is placed under the drum and has a clearance smaller than the length of the elastic fingers. The drum has a drive providing it with line velocity, which is faster than that of the transporter. Under the lower branch of the transporter band, a contrary rotating brush is placed so that it interacts with the transporter fingers, as shown in SU A 1685005.

For example, a mixture of mother and rotten potatoes is carried along the upper part of the transporter. Moving along the transporter band, the root-crops pass under the drum. At this moment, the rotten potatoes are squashed and stick to the fingers, while conditional root-crops move non-damaged under the drum and leave the transporter. The stock root-crops move to the lower band of the transporter, and, under the influence of vibration, and then of the brush, are then taken away to another transporter.

This device is not effective for separating vegetables like tomatoes and peppers from the admixtures because these vegetables are damaged by the drum when it interacts with a heap of vegetables. Therefore, this device is not universal and its application is limited.

Another known device for separating root-crops from admixtures comprises a working organ of an agricultural machine for root-crop processing. This device consists of a finger-hill with upper and lower parts made of separate transporting contours placed at different angles to the horizontal. This working surface of the upper part is fixed under a larger angle than that of the lower part. Both parts are angled downward. A contrary rotating brush is placed over the descending part of the hill, as shown in SU A 158 3018.

Having a small difference in rolling friction coefficients over the finger-hill transporter, rounded clods roll down the more steep upper part. If they are rolling down a less steep lower part, they are caught by the brush and led to the root-crop fraction. If the clods roll together with the fingers of the lower part of the hill, they cannot be led to the transporter carrying out the admixtures because the fingers on the upper part of the hill drop the clods to the brush. This decreases the separating coefficient of the admixtures. Thus, the above-mentioned device can separate only admixtures with an equivalent diameter, which is smaller than the interfinger clearance of the transporter.

SUMMARY OF THE INVENTION

It is therefore an object of the invention to create a device for separating vegetables and root-crops from admixtures that is not dependant on the size of the admixture fractions. This object has been attained by changing the transporter's construction.

This object is achieved as follows: The device for separating vegetables and root-crops from admixtures comprises a transporter with protruding fingers mounted at an inclined angle and receiving the separating products, and an appliance for carrying out the vegetables. The appliance is placed after the transporter. The transporter has at least one bent part of the upper bed, in the region of which the protruding fingers of the transporter move apart and the separating products fall between them. Behind this region, the fingers draw together with sufficient force to clamp and/or destroy at least some part of the admixtures.

The transporter preferably has at least one tensioner for the upper bed forming the bent and inclined parts, and a plurality of rollers mounted on the frame along the transporter to regulate the length and the angle of the pitch of the corresponding inclined parts.

All of the inclined parts of the transporter preferably have an angle of inclination smaller than the angle of friction of the admixtures on the transporter. The angle of inclination of at least one of the downwardly inclined parts should be equal to or larger than the angle of friction of vegetables on the transporter. Preferably, at least the last of the downwardly inclined parts of the transporter should have an angle of inclination equal to or larger than the angle of friction of vegetables on the transporter.

Preferably, an element capable of forcing the separating products into the clearance between the fingers is placed on at least one of the bent parts of the transporter where the fingers move apart.

The transporter may be made of rigid rods with fingers mounted on locked and endless conveying belts, and the protruding fingers may form cells with a size smaller than the size of the vegetables.

It is desirable that the device has an additional inclined transporter placed in front of the main transporter.

It is also convenient for a brush drum to be provided. The brush drum is preferably made of sections with hair of different length and stiffness and has least one of the sections with blades lower than the hair of the sections. Preferably, at least one of the sections has blades alternating with the hair.

In the front zone of the main transporter, it is desirable to mount a device which limits the entrance zone for the products for separation on the transporter. This device should have protruding fingers on its cylinder surface alternating with the fingers of the main transporter while the device and the main transporter are moving.

Preferably, the protruding fingers of the main transporter have different lengths, and the stiffness of the hair on the brush drum is weaker than that of the fingers on the main transporter. In addition, at least one of the inclined parts of the upper bed of the main transporter has a shaking mechanism.

It is desirable that the device have an appliance for dividing the products for separation placed in the zone where they are leaving the brush drum. This appliance should comprise a foundation fixed on the frame so that its angle to the brush drum can be regulated, and it should have protruding fingers directed to the brush drum and forming a comb.

The appliance for dividing the separation products may be fit with a clearance relative to the transporter and the brush drum so that the comb fingers alternate with the brush drum sections, and the hair of the brush drum could protrude over the comb fingers in the zone where the products of separation fall down.

It is desirable that the transporter for vegetables to be placed perpendicularly to and inclined to the brush drum.

This appliance for dividing the products for separation may comprise an amortizating plate placed between the brush drum and the transporter for vegetables.

Each protruding finger on the main transporter may have the shape of an inverted truncated cone or an inverted truncated pyramid, and can be fixed on the main transporter by its smaller foundation. This construction of the device helps to raise the separation quality and complete safety of the process.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 is a side view of the device for separating vegetables and root-crops from admixtures according to the invention;

FIG. 2 is a side view of the transporter for separating vegetables and root-crops from admixtures having several bent parts, according to the invention;

FIG. 14 shows the same appliance with a divider for separating products according to the invention;

FIG. 15 shows a view along the arrow A of FIG. 14;

DETAILED DESCRIPTION OF THE PREFERRED EMBODIMENT

Figure 3:
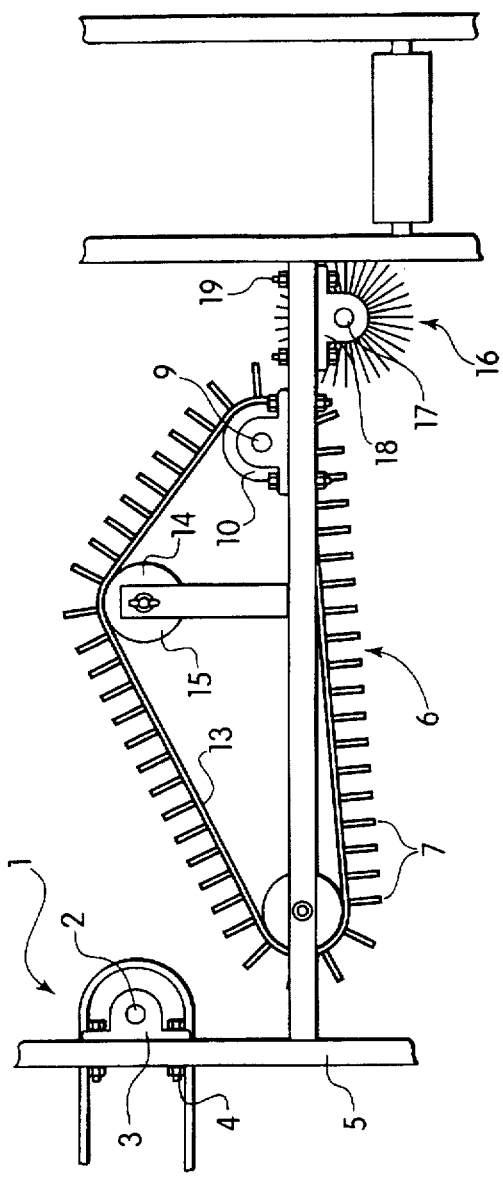
FIG. 3 is a side view of the same device with a brush drum, according to the invention.

Turning now in detail to the drawings and, in particular, FIG. 1, there is shown the device for separating vegetables and root-crops from admixtures, comprising a transporter 1 for moving vegetables to the separator. Its shaft is fixed on frame 5 of the device with the help of bush 3 and fasteners 4.

The main transporter 6 is fixed by shaft 7 on frame 5 by a bush 9 and fasteners 10, and has protruding fingers 7. Transporter 6 is mounted at an angle to the horizontal.

Transporter 6 is made so that it has at least one bent part 12 of upper bed 13. This is realized with the help of an upper bed 13 tensioner which comprises a roller 14 placed on frame 5.

FIG. 2 shows transporter 6 with three bent parts 12, 12', 12" and some inclined parts on upper bed 13 which are formed by the corresponding rollers 14 of the upper bed tensioner, placed along transporter 6. Each roller 14 is fixed in a slot 15 of frame 5 so that it can move along slot 15 to regulate the pitch length and the angle on the corresponding inclined parts.

In the region of the last inclined part of the upper bed 13, a brush drum 16 is placed, as shown in FIG. 3. Its shaft 17 is fixed on frame 5 by a bush 17 and fasteners 19. The position of drum 16 to transporter 8 can be regulated.

All of the inclined parts of transporter 6 are made so that the angle of inclination of bed 13 is smaller than the angle of friction of the admixtures on transporter 6. It allows the admixtures to move along the transporter up to the moment of their separation and not to roll down to the zone where the separating mass is directed.

The angle of inclination of at least one of the downwardly inclined parts of the upper bed, and most preferably, of the last one, must be equal to or larger than the angle of friction of vegetables on transporter 6. If the angle of inclination is smaller than the angle of friction, the vegetables will be stopped on the downwardly inclined part of transporter 6, and the quality of the separation will deteriorate.

Figure 4:
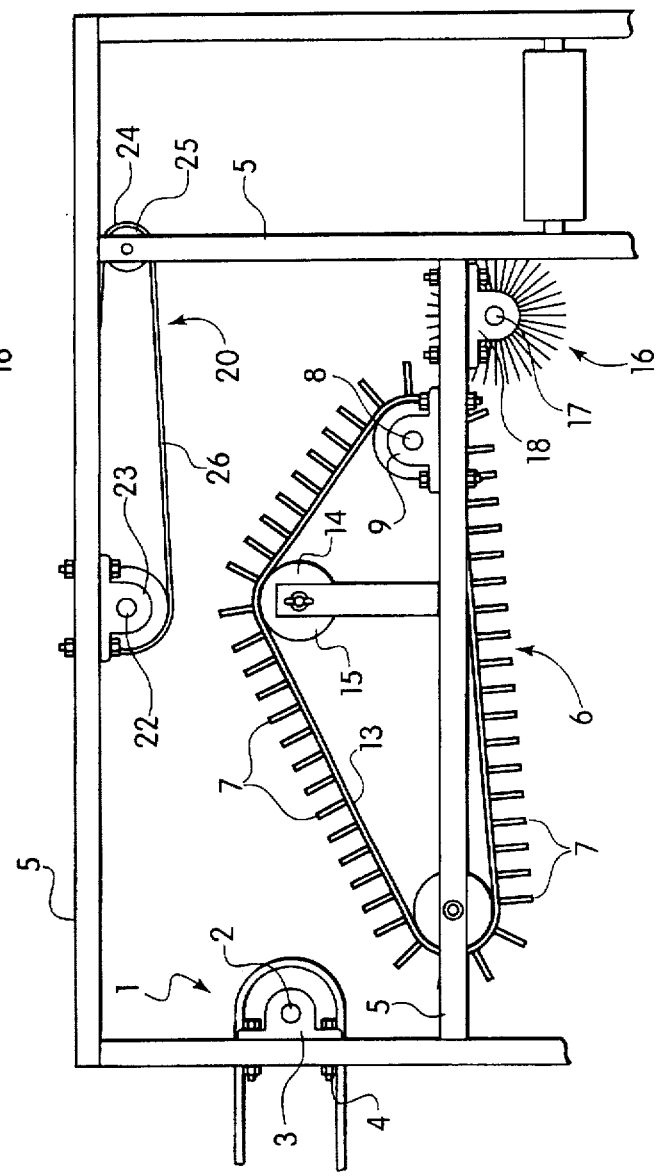
FIG. 4 is a side view of another embodiment of the device according to the invention.
Figure 5:
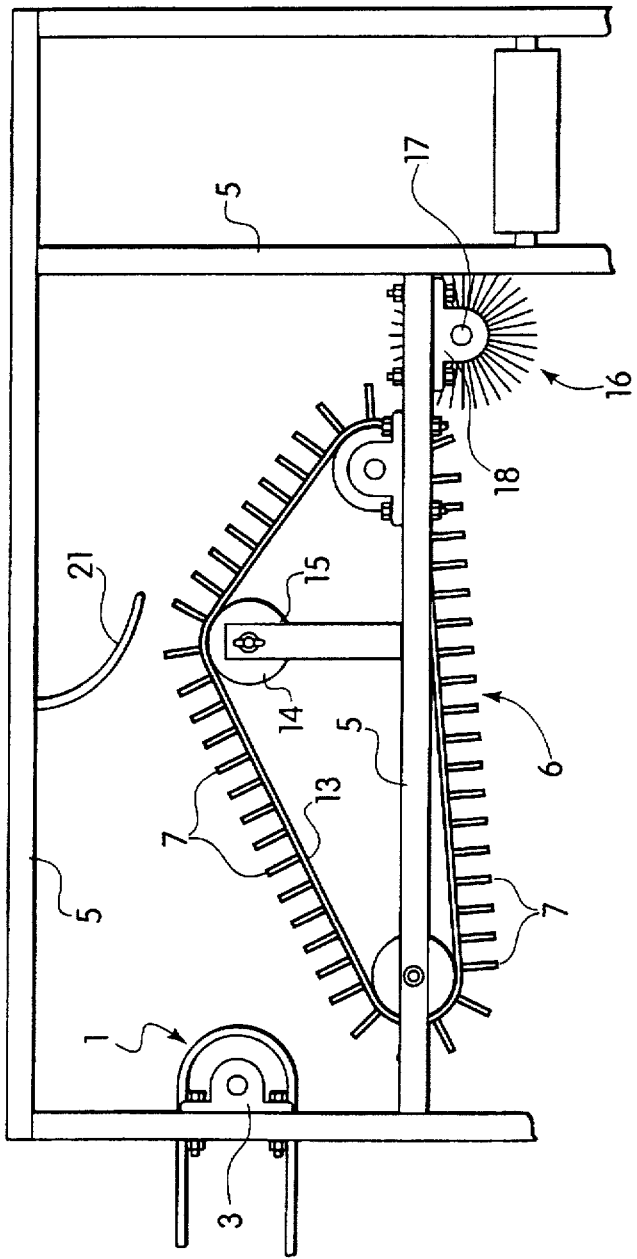
FIG. 5 is a side view of another embodiment of the device according to the invention.

As shown in FIG. 4, a forced plunging element is placed between fingers 7 of transporter 6. It comprises transporter 20 or, as shown in FIG. 5, a bent plate 21. Shaft 22 of transporter 20 is fixed in bush 23 on frame 5 and shaft 25 is fixed in slot 25 of frame 5 so that they can move, changing the distance between bed 26 of transporter 20 and upper bed 13 of transporter 6. As shown in FIG. 5, plate 21 is fixed on frame 5 and its convex side faces transporter 6. Transporter 20 or plate 21 are placed over one or more bent parts 12 of upper bed 13 of transporter 6.

Figure 6:
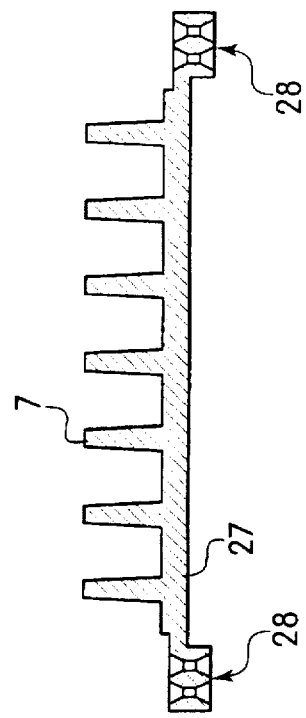
FIG. 6 shows a rod of the transporter according to the invention.

It is more technologically sound to have transporter 6 include a set of rigid rods 27, as shown in FIG. 6. Each rod is fixed on a locked and endless belt 23. Each rod is separated from the other with sufficient clearance that some separated admixtures fall through.

It is preferable that rod 27 and its corresponding fingers 7 should be made a single unit as it is shown in FIG. 6. Fingers 7 on rod 27 are placed relative to each other and to fingers 7 of the next rod 27 so as to create cells that are smaller than the average size of the separated vegetables.

Figure 7:
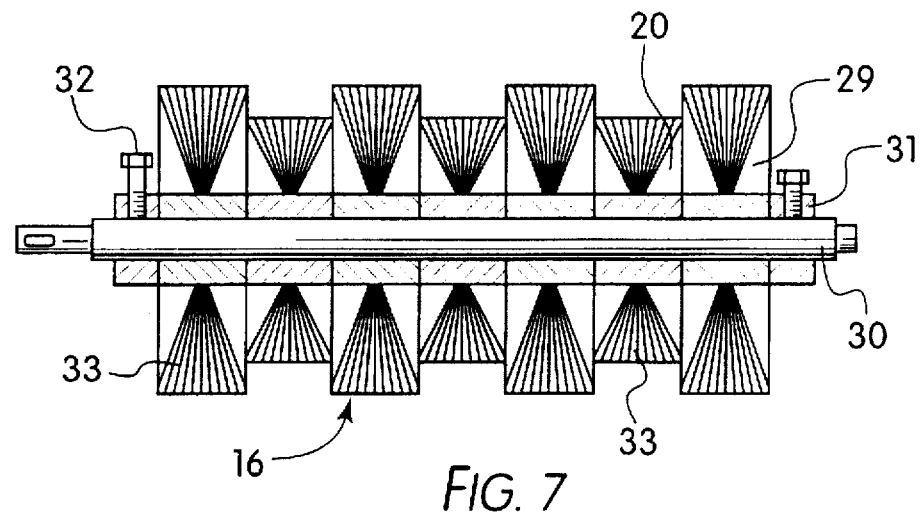
FIG. 7 shows the brush drum in longitudinal section according the invention.

Brush drum 16, as shown in FIG. 7, is made of sections to raise the efficiency of the separation. All the sections 29 are mounted on shaft 30 where they are fixed by bushes 31 and screws 32.

Figure 8:
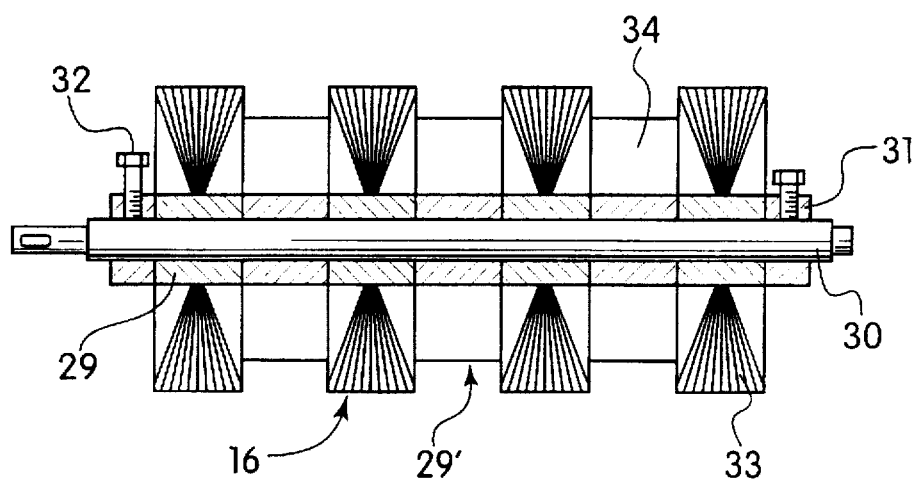
FIG. 8 shows another embodiment of the brush drum according to the invention.

Sections 29 have hair 33 of different length and stiffness alternating with one another along shaft 30. One or more sections 29 have blades 24 instead of hair 33, as shown in FIG. 8. This improves the separating process greatly. Sections 29 alternate along shaft 30 with hair 33 and blades 34, which are lower in height than hair 33.

Figure 9:
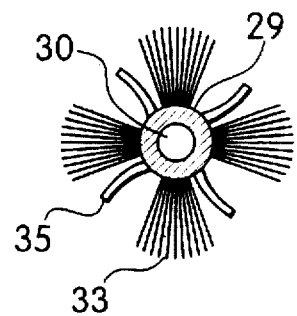
FIG. 9 shows a section of the brush drum in side view according to the invention.

However, blades 35 may be placed on one section 29 with hair 33 and alternate with sections of hair 33, as shown in FIG. 9.

The stiffness of hair 33 must be weaker than that of fingers 7, lest vegetables be damaged.

Figure 10:
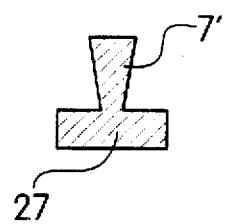
FIG. 10 shows a sectional view of the protruding finger according to the invention.
Figure 11:
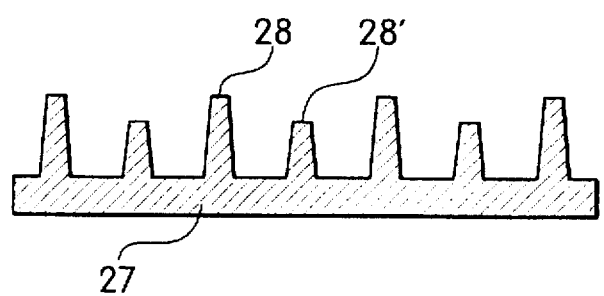
FIG. 11 shows the transporter rod with fingers of different length according to the invention.

Fingers 7' have the shape of an inverted truncated cone or a truncated pyramid and are fixed on rods 27 of transporter 6 by means of their small foundation, as shown in FIG. 10. Fingers 28 and 28' may have different heights, which provides the efficient separation of different vegetables and root-crops, as shown in FIG. 11.

Figure 12:
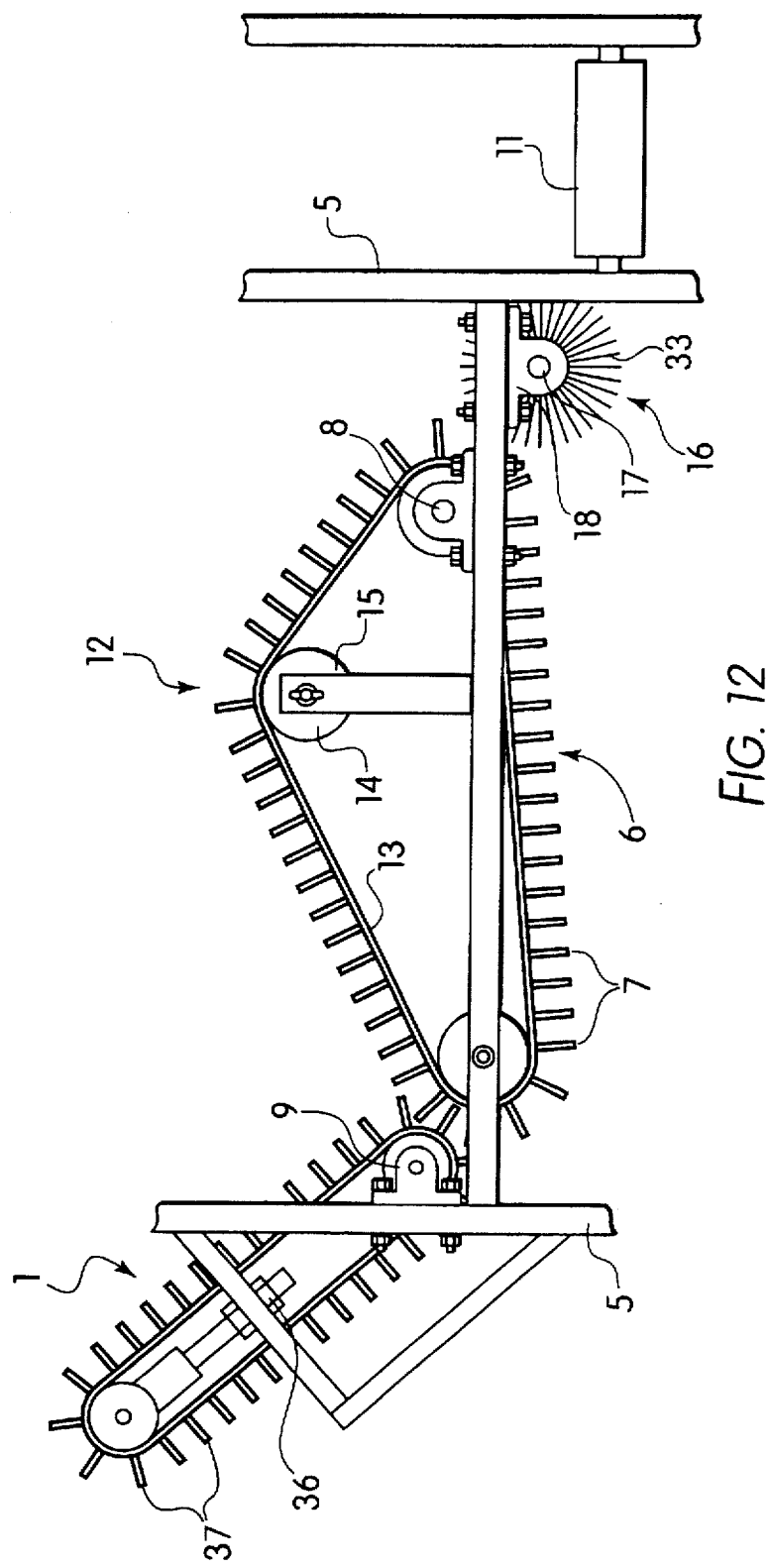
FIG. 12 shows the appliance with the downwardly inclined transporter according to the invention.
Figure 13:
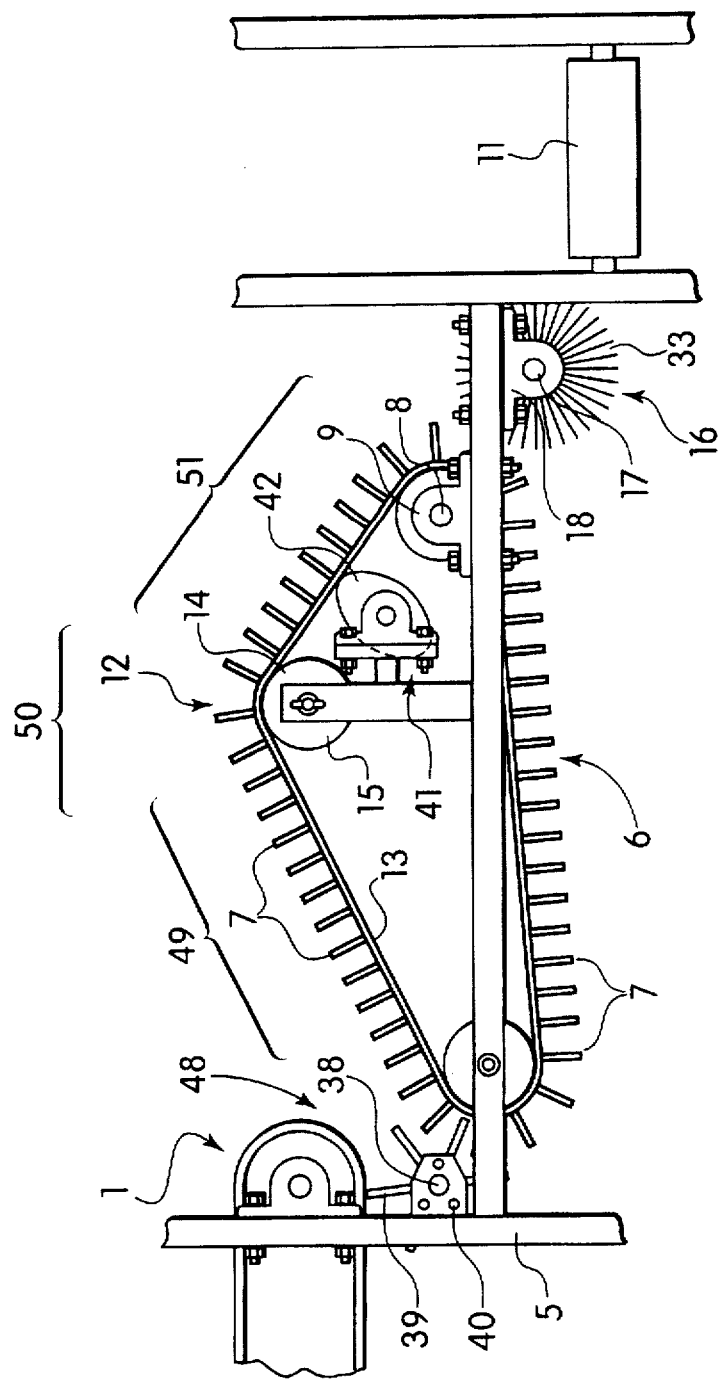
FIG. 13 shows the same appliance with a vibrator according to the invention.

As shown in FIG. 12, transporter 1 is made similar to transporter 6 and is mounted in front of transporter 6 inclined from the horizontal. It is fixed with bushes 9 on frame 5 and has its own drive 36 and protruding fingers 37. In the zone of the first part of transporter 6, shown in FIG. 13, is a device for limiting the zone of appearance of the products for separation on transporter 6. It comprises a shaft 38 with protruding fingers 30 which are placed so that fingers 7 and 39 alternate while transporter 6 and shaft 38 are both moving. Shaft 38 is fixed on frame 5 by fasteners 40.

In order to improve the separation of vegetables from admixtures, a shaker 41 is placed near one of the downwardly inclined parts of transporter 6. This device 41 has an eccentric shaft 42 interacting with upper bed 13 of transporter 6.

In order to maximize the efficiency of the separation process, in the area where the products descend from brush 15, a device 43 for dividing vegetables and admixtures is placed, as shown in FIG. 14. It comprises a foundation 44 and protruding rods 45. Foundation 44 is mounted on hinges on frame 5 with the help of a screw-nut 46 that regulates the outgoing of hair 33 over rods 45 in the zone where separating products contact brush drum 16.

Rods 45 are directed to brush drum 16 and form a comb with step A, as shown in FIG. 15. Rods 45 and hair sections 33 of drum 16 are alternate with each other.

Between the ends of rods 45 of the comb and fingers 7 of transporter 6, there is a clearance "b" determining the open hair 33 zone of brush drum 16 and rods 45 of the comb are placed alternating each other with step "a". The use of the comb increases the longitudinal stiffness of hair 33 of brush drum 16 with the products of separation contact it. As a result, the quality of separation deteriorates.

Figure 16:
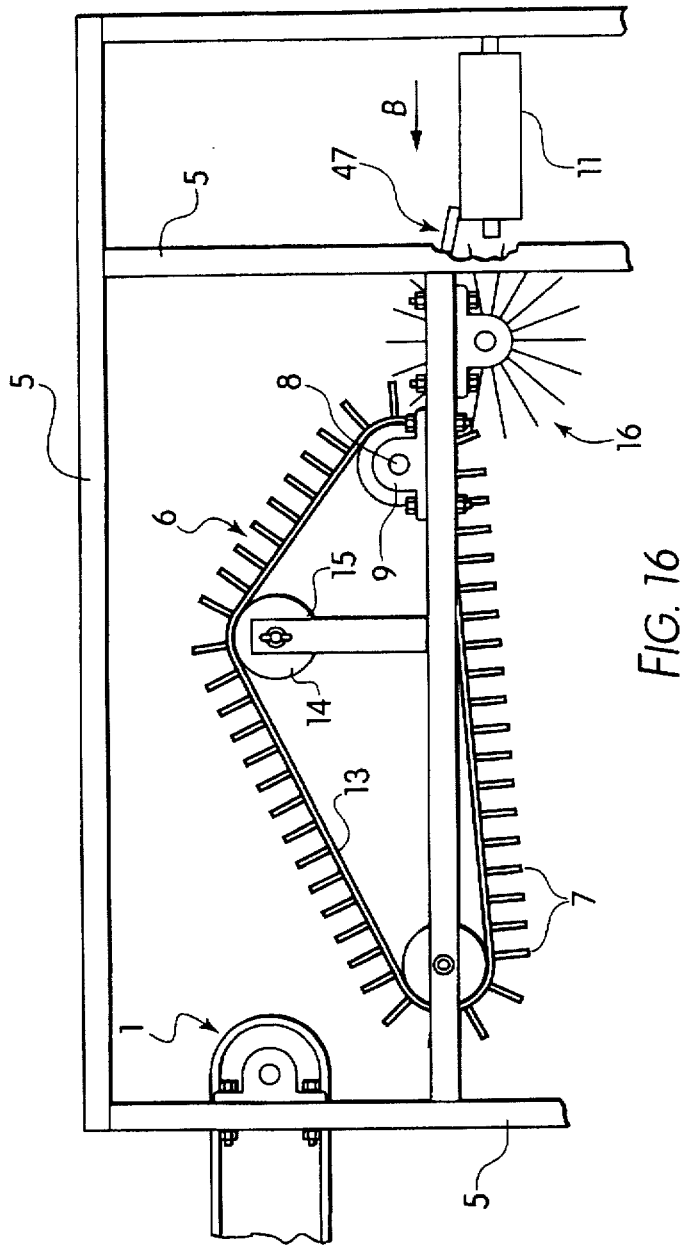
FIG. 16 shows the same appliance with an amortizing plate according to the invention.
Figure 17:
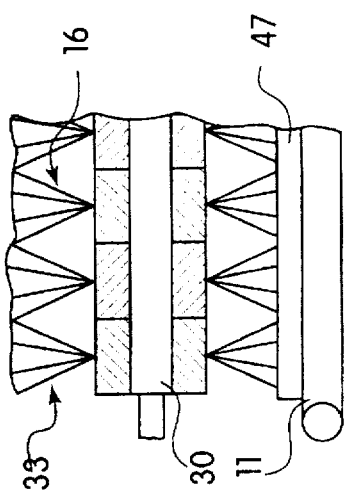
FIG. 17 shows a view along the arrow B of FIG. 16.

Instead of the comb in the zone of descending of separating products down brush drum 16, an amortizating plate 47, as shown in FIGS. 16 and 17 may be placed and fixed on frame 5 to regulate the angle of inclination. Plate 47 has a drive of horizontal travel across brush drum 16.

In the zone where the separating products fall down, hair 33 of drum 16 projects over rods 45.

Transporter 11 is placed perpendicularly and inclined to drum 16.

The device for separating vegetables and root-crops from admixtures works as follows:

Separating products move along transporter 1 (FIGS. 1, 12 and 13) to zone 48 limited by shaft 38, which does not allow them to be screened through the clearance between transporters 1 and 6.

The vegetables move along transporter 8 to zone 49, at the end of which all the components of the vegetable heap rest. The regulated angle of the inclined upper bed zone permits the vegetable heap to move to zone 50 as one stratum. When fingers 7 of bed 13 on the transporter open, vegetables plunge into the interfinger clearance with help of plate 21 or transporter 20 because fingers 7 on upper zone bed 13 of transporter 6 move apart and clearance of the corresponding size appears. Products of the separation drop through it. After bed 13 of transporter 6 have passed roller 14 of the tensioner, fingers 7 move to zone 51 providing the expulsive force overcoming of the force of friction and of gravity of standard vegetables. As the friction coefficient of soil clods or damaged pulp vegetables sliding, for example on rubber, is much more than the friction coefficient of standard vegetables on their peels, the soil clods are clutched in zone 51 by elastic fingers 7. At that moment, the expulsive force is less than the force of friction and of gravity, and the soil clods are moved to zone 47 of transporter 6. Due to the compressive force of fingers 7, some admixtures are damaged and are moved away through the clearance between rods 28.

Fingers 7 will go on moving apart and pressing if transporter 6 has several bent parts, as it is shown in FIG. 2. The larger part of the admixtures are damaged because the different up and down angles of upper bed 13 influence the compressive force on different parts of the bed.

From the last downwardly inclined part of transporter 6 (FIGS. 12 and 13) the products of separation move to brush drum 16 where the admixtures are picked up with its hair 33 and/or blades 34 and 35 and are separated from the mass.

Standard vegetables rolling on transporter 6 or moved by fingers 7 farther than the admixtures, slide down on hair 33 to transporter 11 for standard vegetables.

As there is a difference between friction coefficients of standard vegetables and admixtures on hair 33 of drum 16, and because of the movement starting conditions of the vegetable heap and its appearing near drum 16, when standard vegetables are rolling and admixtures are immovable, the vegetables are moved to the diametrical transporter in its first part.

Due to the fact that sections 29 have hair 33 of different stiffness and length, and the stiffness of hair 33 is weaker than that of fingers 7, the conditions of the separation improve.

An additional vibration of bed 13 is made by shaker 42, and it provides better separation of vegetables from admixtures.

When the comb is mounted as shown in FIG. 14, standard vegetables appear on it farther from the vertical axis of brush drum 16 and the admixtures appear nearer on that part of the transporter where the protruding hair is higher, i.e., b>c>d. Thus, the catching ability of brush drum 16 of admixtures is greater, and they are dropped down towards its rotating. In a case where a clod equal to a standard vegetable appears on the comb, it is caught by the hair and moved to transporter 6 because its uneven shape determines the depth of plunging into the comb clearance, and because the bigger friction coefficient on the hair of brush drum 16. The open hair clearance "b" of brush drum 16 permits it to take away the admixtures clutched by fingers 7 of transporter 6, which do not contact rods 45 of the comb.

When the products of separation are moved away diametrically by the comb of transporter 11, final sorting of vegetables from small admixtures occasionally drawn to the bed when the vegetables were reloading from transporter 1 to transporter 6, takes place with the help of the brush drum.

The interrod space of the comb is constantly cleared by the hair of brush drum 16. The use of an active toothed rack made of rotating hoops with the same interrod space is quite possible.

The diametrical angle of transporter 11 is most preferably fixed as a sharp one relative to the vertical line and its upper plane. When the vegetable ratio in the heap led from transporter 6 is rather high, this angle must be an obtuse one. This helps vegetables to roll down from the zone where the brush drum acts when the products of separation are drawn aside diametrically.

When the amortizating plate 47 is mounted behind and near brush drum 16 as shown in FIGS. 16 and 17, soil and vegetable admixtures, as well as damaged fruits, which have a small coefficient of friction in comparison with standard vegetables, find themselves under the influence of the brush drum's hair capture force. They are drawn away by the hair towards the brush drum's rotating. Standard vegetables leave this zone because of the considerable coefficient of their restoration and they are led to transporter 11.

The device for separating vegetables and root-crops from admixtures is universal and may be used independently or as a part of agricultural harvesting combines. The efficiency of the device is very high: no less than 85–95%.

This invention may be used for the harvesting and separating from admixtures of potatoes and juicy vegetables like tomatoes, eggplants and peppers.

We claim:

1. A device for separating vegetables and root-crops from admixtures, comprising:
   a transporter mounted on a frame and having a plurality of protruding fingers for receiving separation products comprised of vegetables and admixtures, said transporter having an upper bed with at least one bent part so as to create upwardly and downwardly inclined parts, said bent part causing the protruding fingers to move apart and allow the separation products to drop therebetween, wherein after said fingers pass through said bent part, said fingers clamp together and destroy at least a portion of the admixtures; and
   a device for removal of the vegetables from the transporter, said device mounted to an exit end of the transporter.

2. The device according to claim 1, wherein the transporter has at least one upper bed tensioner forming the bent part and inclined parts, comprising rollers mounted on the frame along the transporter to regulate the length and angle of pitch of the inclined parts.

3. The device according to claim 1, further comprising a brush drum, having an adjustable angle relative to the transporter, said brush drum being mounted near the last inclined part of the transporter.

4. The device according to claim 2, wherein all of the upwardly inclined parts of the transporter have an angle of inclination smaller than the angle of friction of the admixtures, and wherein at least one of the downwardly inclined parts has an angle of inclination that is greater than the angle of friction of the vegetables.

5. The device according to claim 4, wherein the last of the downwardly inclined parts has an angle of inclination that is greater than or equal to the angle of friction of the vegetables.

6. The device according to claim 3, wherein all of the upwardly inclined parts of the transporter have an angle of inclination smaller than the angle of friction of the admixtures, and wherein at least one of the downwardly inclined parts has an angle of inclination that is greater than the angle of friction of the vegetables.

7. The device according to claim 1, further comprising at least one element capable of forcing the separation products between the fingers, said element placed near the bent part of the transporter.

8. The device according to claim 1, wherein the transporter is made of rigid rods, and wherein the fingers are locked on an endless conveyor belt.

9. The device according to claim 1, wherein the protruding fingers form cells having a size smaller than the size of the vegetables.

10. The device according to claim 8, wherein the protruding fingers form cells having a size smaller than the size of the vegetables.

11. The device according to claim 1, further comprising an additional inclined transporter mounted in front of said transporter.

12. The device according to claim 3, wherein the brush drum is made of sections and the sections have hair of different length and stiffness.

13. The device according to claim 12, wherein the brush drum has at least one section having blades that are shorter than the hair on the brush drum.

14. The device according to claim 12, wherein the brush drum has at least one section having blades alternating with hair.

15. The device according to claim 13, wherein the brush drum has at least one section, having blades alternating with hair.

16. The device according to claim 1, further comprising a cylindrical device for limiting the zone of appearance of separating products on the transporter and mounted in front of the transporter, said cylindrical device having protruding fingers on its cylindrical surface, said protruding fingers alternating with the protruding fingers on the transporter while the cylindrical device and transporter are moving.

17. The device according to claim 1, wherein the protruding fingers of the transporter have different lengths.

18. The device according to claim 3, wherein the stiffness of the hair on the brush, drum is weaker than that of the fingers on the transporter.

19. The device according to claim 1, further comprising a shaking mechanism placed on at least one of the downwardly inclined parts of the upper bed of the transporter.

20. The device according to claim 1, wherein each of the protruding fingers on the transporter has a shape selected from the group consisting of a truncated cone and a truncated pyramid, and wherein the fingers are fixed on the transporter by their smaller foundations.

21. The device according to claim 3, further comprising an appliance for dividing the separation products, said appliance being placed in the region where said products exit the brush drum.

22. The device according to claim 12, further comprising an appliance for dividing the separation products, said appliance being placed in the region where said products exit the brush drum.

23. The device according to claim 21, wherein the appliance includes a foundation fixed on the frame of the transporter for regulating the angle of the brush drum, and further comprising a plurality of protruding rods arranged on the appliance, said rods being directed toward the brush drum and forming a comb.

24. The device according to claim 22, wherein the appliance includes a foundation fixed on the frame of the transporter for regulating the angle of the brush drum, and further comprising a plurality of protruding rods arranged on the appliance, said rods being directed toward the brush drum and forming a comb.

25. The device according to claim 21, wherein the appliance is placed with a clearance (b) relative to the transporter.

26. The device according to claim 22, wherein the appliance is placed with a clearance (b) relative to the transporter.

27. The device according to claim 24, wherein the appliance is positioned so that the rods alternate with the sections of the brush drum.

28. The device according to claim 27, wherein the hair of the brush drum protrudes over the rods in the region where the separation products fall down.

29. The device according to claim 21, wherein the device for removal of the separation products comprises an additional transporter placed at an incline and perpendicular to the brush drum.

30. The device according to claim 22, wherein the device for removal of the separation products comprises an additional transporter placed at an incline and perpendicular to the brush drum.

31. The device according to claim 21, wherein the appliance comprises an amortizing plate placed between the brush drum and the device for removal of the separation products.

32. The device according to claim 22, wherein the appliance comprises an amortizing plate placed between the brush drum and the device for removal of separation products.

* * * * *